(12) United States Patent
Norman et al.

(10) Patent No.: US 6,481,774 B1
(45) Date of Patent: Nov. 19, 2002

(54) COMBINATION SIDE PANEL EXTENSIONS AND BOX ENCLOSURE FOR USE WITH A BED OF A PICKUP TRUCK

(76) Inventors: Cecil Norman, 2119 Howard Ave., Flint, MI (US) 48503; Kesha D. Norman, G-3268 Cheyenne, Burton, MI (US) 48529

( * ) Notice: Subject to any disclaimer, the term of this patent is extended or adjusted under 35 U.S.C. 154(b) by 0 days.

(21) Appl. No.: 09/919,400

(22) Filed: Jul. 31, 2001

(51) Int. Cl.[7] .......................... B60R 9/06; B62D 33/033
(52) U.S. Cl. ......................................... 296/37.6; 296/36
(58) Field of Search ................................ 296/3, 10, 32, 296/36, 37.6, 26.04; D12/93

(56) References Cited

U.S. PATENT DOCUMENTS

| | | | |
|---|---|---|---|
| 2,011,965 A | * 8/1935 | Ball ........................ | 296/26.04 |
| 3,475,046 A | * 10/1969 | Webster .................... | 296/3 |
| 4,585,264 A | * 4/1986 | Miller ...................... | 296/3 |
| 4,635,992 A | 1/1987 | Hamilton et al. .......... | 296/37.6 |
| 4,938,398 A | * 7/1990 | Hallsen ................... | 296/37.6 X |
| 5,524,951 A | 6/1996 | Johnson .................... | 396/37.6 |
| 5,961,173 A | 10/1999 | Repetti .................... | 296/37.6 |
| 6,012,754 A | 1/2000 | Clare et al. ............... | 296/37.6 |
| 6,095,588 A | 8/2000 | Rodosta ................... | 296/100.09 |
| 6,183,035 B1 | 2/2001 | Rusu et al. ............... | 296/100.07 |
| 6,203,086 B1 | 3/2001 | Dirks et al. ............... | 296/37.6 |

FOREIGN PATENT DOCUMENTS

DE          1555700       * 1/1970 ................. 296/36

* cited by examiner

Primary Examiner—Dennis H. Pedder
(74) Attorney, Agent, or Firm—Gifford, Krass, Groh, Sprinkle, Anderson & Citkowski, P.C.

(57) ABSTRACT

A combination side panel and storage container assembly for use with a pickup truck. The truck includes a bed defined by a bottom, a front wall, extending side walls and a rear tail gate, the side walls. The assembly includes a pair of main side panels each having a substantially planar and elongated shape and engageable in fixed and upwardly extending fashion from the extending side walls of the truck bed. A pair of rear side panels each also have a substantially planar and elongated shape and are interengageable in horizontally inserting fashion with associated main side panels, concurrent with affixing in upwardly extending fashion from the extending side walls of the truck bed. A storage container supported upon the truck bed bottom in proximity to the rear tail gate, said storage container including a hingedly secured lid.

11 Claims, 5 Drawing Sheets

COMBINATION SIDE PANEL EXTENSIONS AND BOX ENCLOSURE FOR USE WITH A BED OF A PICKUP TRUCK

BACKGROUND OF THE INVENTION

1. Field of the Invention

The present invention relates generally to cargo restraining and storing devices for use with pickup-truck type vehicles. More specifically, the present invention discloses a combination side panel extension and rear box enclosure for use with a pickup truck bed and which provides the combined features of upwardly extendable side panels secured to the side of the truck bed and of a rearwardly situated and hingedly covered storage device easily accessible from the direction of the truck's tail gate.

2. Description of the Prior Art

The prior art is well documented with examples of storage systems for use with truck type vehicles. U.S. Pat. No. 6,012,754, issued to Clare, teaches a hidden storage system incorporated into the wheel well area of the bed of a vehicle and which utilizes hinges to open and close the fender/side panel of the bed. The storage system further includes a single assembly composed of a storage box and hinged side panels located on at least one side of the bed. The side panels are again best illustrated in FIGS. 2 and 3 and include braces and a hinge which extends the full length of the truck bed.

U.S. Pat. No. 6,095,588, issued to Rodosta, discloses a folding truck bed and cover including a front panel, rear panel and at least one intermediate panel. The width of the panels converge from the front of the truck to the rear, allowing the rear panel to fold down into the bed and form a storage box within the truck bed when the cover is folded up toward the front of the truck.

U.S. Pat. No. 4,635,992, issued to Hamilton, teaches a storage box suspended on side rails of a conventional pickup truck bed and so that it can be slid along the length of the cargo compartment. The storage box is opened from the front or rear of the cargo bed and the top panel can be completely removed from the storage box while it is held in a confined space with limited headroom.

Additional examples of combination toolboxes and top covers for pickup truck beds are illustrated in U.S. Pat. No. 6,203,086, issued to Dirks, and U.S. Pat. No. 5,961,173, issued to Repetti. The Dirks patent illustrates a storage unit situated rearwardly of the truck cab and an upwardly and pivotally actuable tonneau style cover. The Repetti patent illustrates, in one embodiment, multiple sections which are foldable over each other in accordion fashion to a storage position proximate a front end location of the truck bed.

SUMMARY OF THE PRESENT INVENTION

The present invention is an improvement over the prior art in that it provides a combination side panel and storage container assembly which is both adaptable for use with many existing truck bed designs, while providing concurrent benefits for additional holding capacity for items placed in the truck bed and which would otherwise extend over the existing side walls, combined with more easily accessible and securely lockable storage capacity proximate the rear tail gate. The present invention further enjoys the benefits of durability of construction and secure assembly and affixation to the existing truck bed designs.

The existing truck bed is typically defined by a bottom, front wall, extending side walls, and rear tail gate. The side walls typically have further defined therein substantially downwardly extending and recessed apertures.

The assembly includes a pair of main side panels, each having a substantially planar and elongated shape and further including downwardly extending stabilizer pins which are receivingly engaged within associated ones of the recessed apertures and in order to arrange the side panels in upwardly extending fashion from the extending side walls of the truck bed. It is also typical, although not limiting, that the main side panels are arrayed along the sides of the truck bed in a location proximate the front wall.

In certain applications, a pair of rear side panels are employed, each having a similar and typically reduced planar and elongated shape and each also including downwardly extending stabilizer pins which are receivingly engaged within additional and associated downwardly recessed apertures of the truck bed. The ability to interengage the rear panels with the main panels is also provided by associating pluralities of horizontally projecting pins and horizontally recessed apertures defined therebetween. In one arrangement, the pins are defined in horizontally projecting fashion from the rear panels, and the main side panels each further include the horizontally extending recesses defined in associated rearwardly facing edges which receivingly engage the pins of an associated rear panel.

A storage container is supported upon the truck bed bottom in proximity to the rear tail gate. The container has a given three dimensional, preferably modified cuboidal, shape with a base constructed of a bottom, first and second side walls, rear wall and front wall further defined by first and second surfaces configured for mating with wheel wells configured in the truck bed and to fixedly position the storage container in proximity to the rear tail gate. A locking mechanism is further provided for securing the lid in a closed position over the base.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
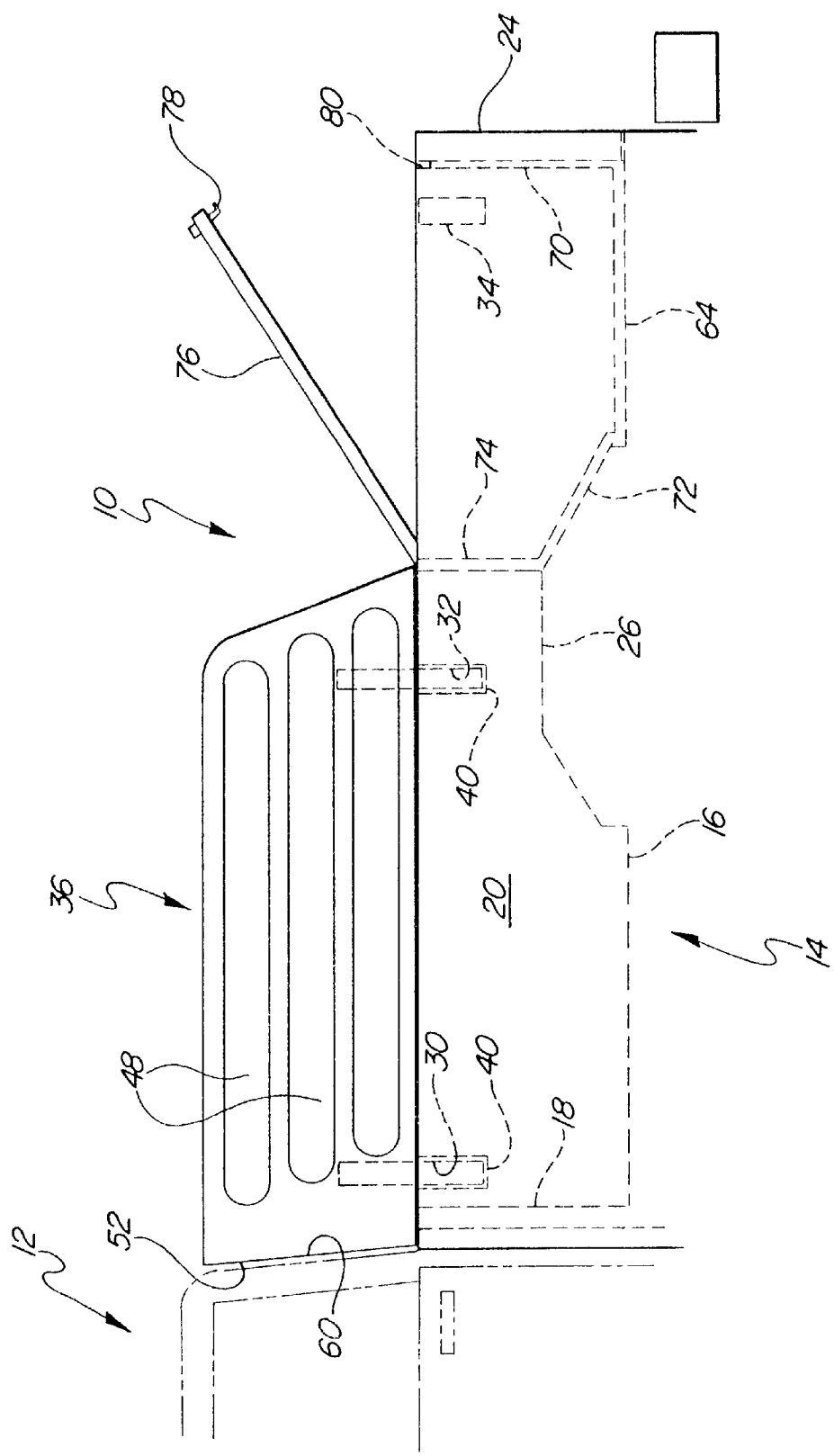
FIG. 1 is a side view, in partial phantom, and illustrating the combination side panel extensions and rearwardly situated storage container according to the present invention.

Referring now to FIG. 1, a side view, in partial phantom, is illustrated at 10 of the combination side panel extensions and rearwardly situated storage container according to the present invention. As previously explained, the present invention is an improvement over the prior art in that it provides a combination side panel and storage container assembly which is both adaptable for use with many existing truck bed designs, while providing concurrent benefits for additional holding capacity for items placed in the truck bed and which would otherwise extend over the existing side walls, combined with more easily accessible and securely lockable storage capacity proximate the rear tail gate.

Figure 2:
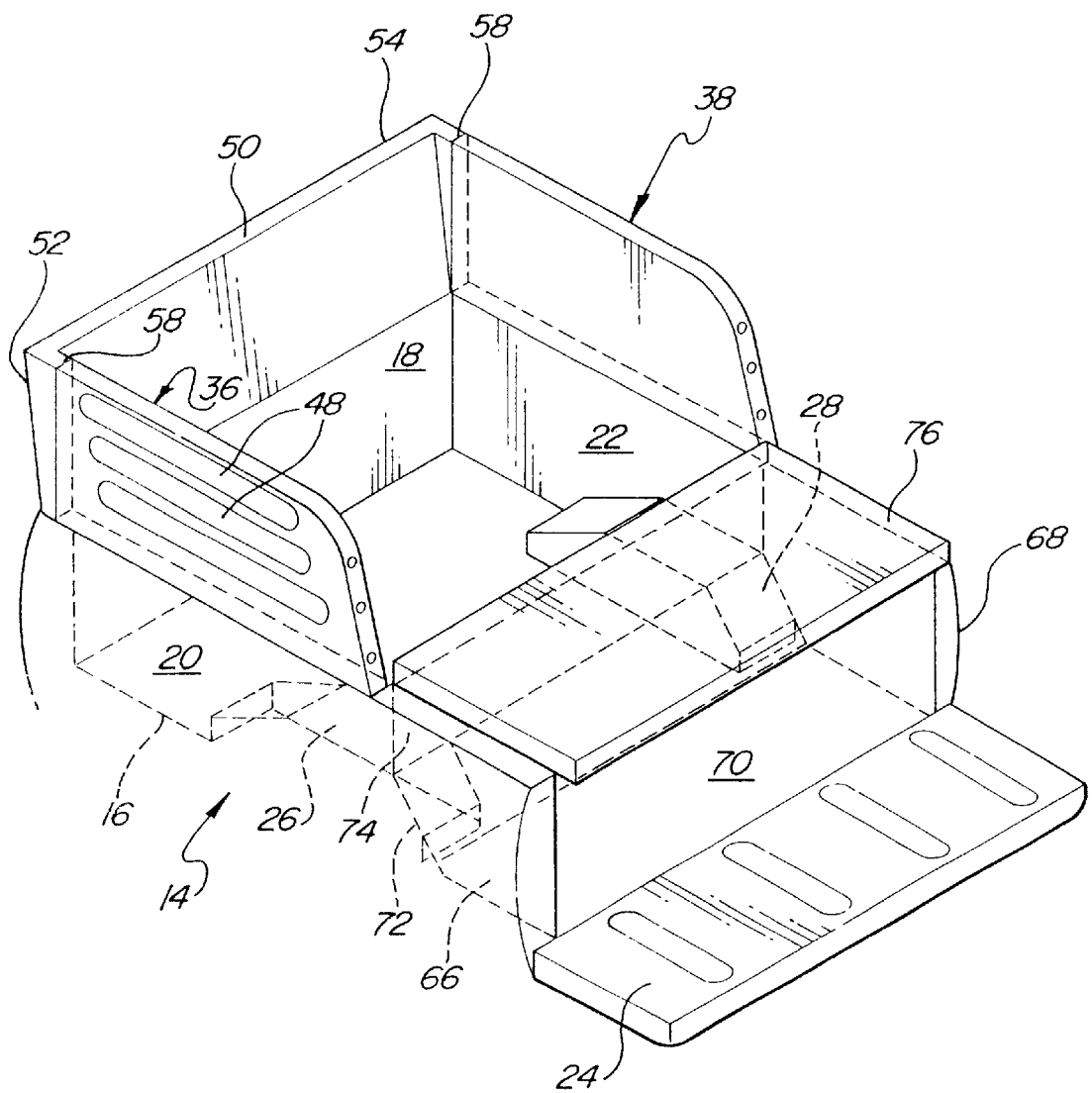
FIG. 2 is a perspective view of the side panel extensions and storage container illustrated in FIG. 1.

Referring again to FIG. 1, the truck is again illustrated in phantom with a cab 12 and a truck bed 14, the bed typically defined by a bottom 16, front wall 18, extending side walls (see left side wall 20 with an identical and unseen right side wall also illustrated at 22 in FIG. 2), and rear tail gate 24. Referring again to FIGS. 1 and 2, first 26 and second 28 wheel wells are defined in the bottom 16 of the truck bed, at a given position, and in proximity to the first 20 and second 22 side walls.

Figure 5:
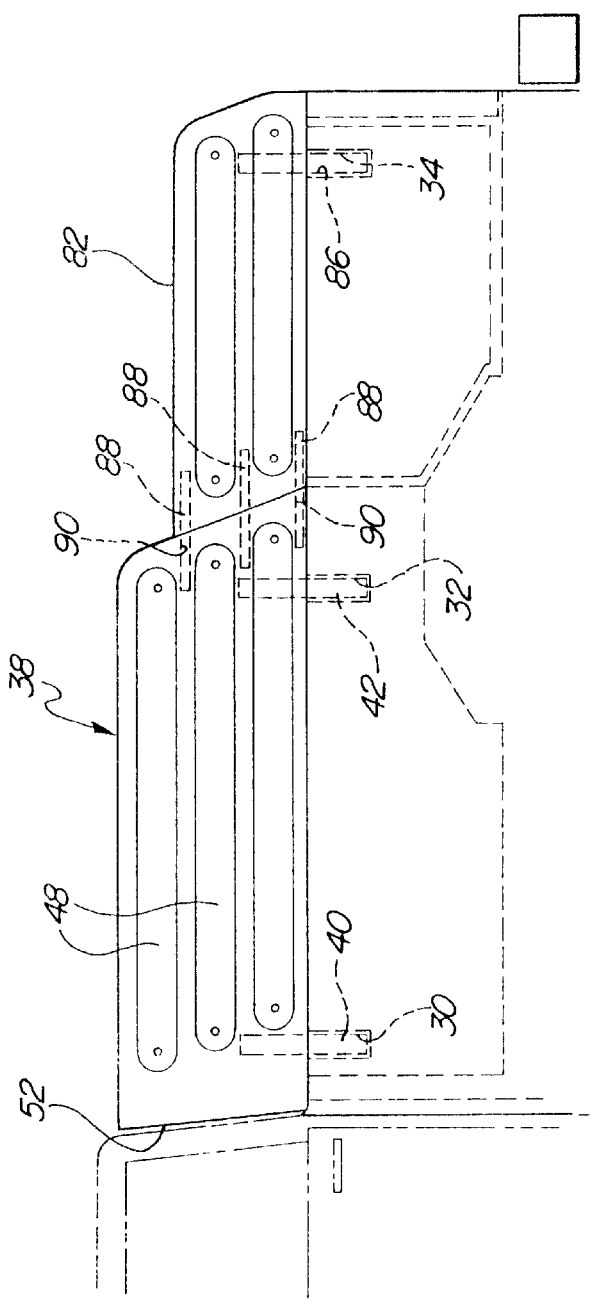
FIG. 5 is a side view, in, partial phantom, of a further variant of the present invention and illustrating a second pair of rear side panels interconnecting with the main panels to extend the side panels to the substantial length of the truck bed.

The side walls 20 and 22 typically have further defined therein substantially downwardly extending and recessed apertures and which are illustrated at 30, 32 and 34 for side wall 20 in the left side view of FIGS. 1 and 5. Again, it is understood that the corresponding right side wall 22 would include similar recessed apertures and it is also contemplated that the location and configuration of such apertures, usually provided for in the vehicle bed design, may vary without departing from the scope of the invention.

Referring again to FIGS. 1–3, the assembly includes a pair of main side panels 36 and 38, each having a substantially planar and elongated shape and further including downwardly extending stabilizer pins, see at 40 and 42 for side panel 36 and at 44 and 46 for side panel 38, which are receivingly engaged within associated ones of the recessed apertures (see in particular first and second selected apertures 30 and 32 on left side 20) and in order to arrange the main side panels 36 and 38 in upwardly extending fashion from the extending side walls 20 and 22 of the truck bed. In one preferred application, the downwardly extending stabilizer pins 40 and 42 & 44 and 46, merely rest within their associated side wall receiving apertures and are held in place by gravity alone. It is however understood that additional locking or affixing mechanisms can be employed for fixedly restraining the side panels 36 and 38 to the truck side walls 20 and 22 and such may include clamps, bolt and nut fasteners and the like.

As also previously described, it is typical, though not limiting, that the main side panels are arrayed along the sides of the truck bed in a location proximate the front wall. As best also shown in FIG. 1, the main side panels (referring specifically to left side panel 36 illustrated in the side view) are constructed of a durable material, such as a hardened plastic, and may further be vacuum formed or otherwise constructed with a desired decorative pattern 48. As also previously explained, the purpose of the side panels 36 and 38 is to extend the height of the truck side walls 20 and 22 and to permit the vehicle to securely carry additional or larger sized items (not shown) than which would be possible absent the side panels 36 and 38 or without the application of additional hold-down straps and the like.

The side panels 36 and 38 of the present assembly 10 may further include a cross wise extending and interconnecting front panel 50. The front panel 50 is generally constructed of the same material as the main side panels 36 and 38 and includes a generally planar and elongated shape. Additionally the front panel 50 includes both forwardly extending and tapered edges, see at 52 and 54, as well as substantially planar and rear facing edges 56 and 58 for interconnecting, respectively, with the main side panels 36 and 38. The configuration of the front panel 50 is intended in part to compensate for the slightly forwardly angled configuration of the truck cab 12 relative the bed (see at 60 in FIG. 1), as well as to provide for ease of interconnection with the associated forward edges of the side panels 36 and 38.

Figure 3:
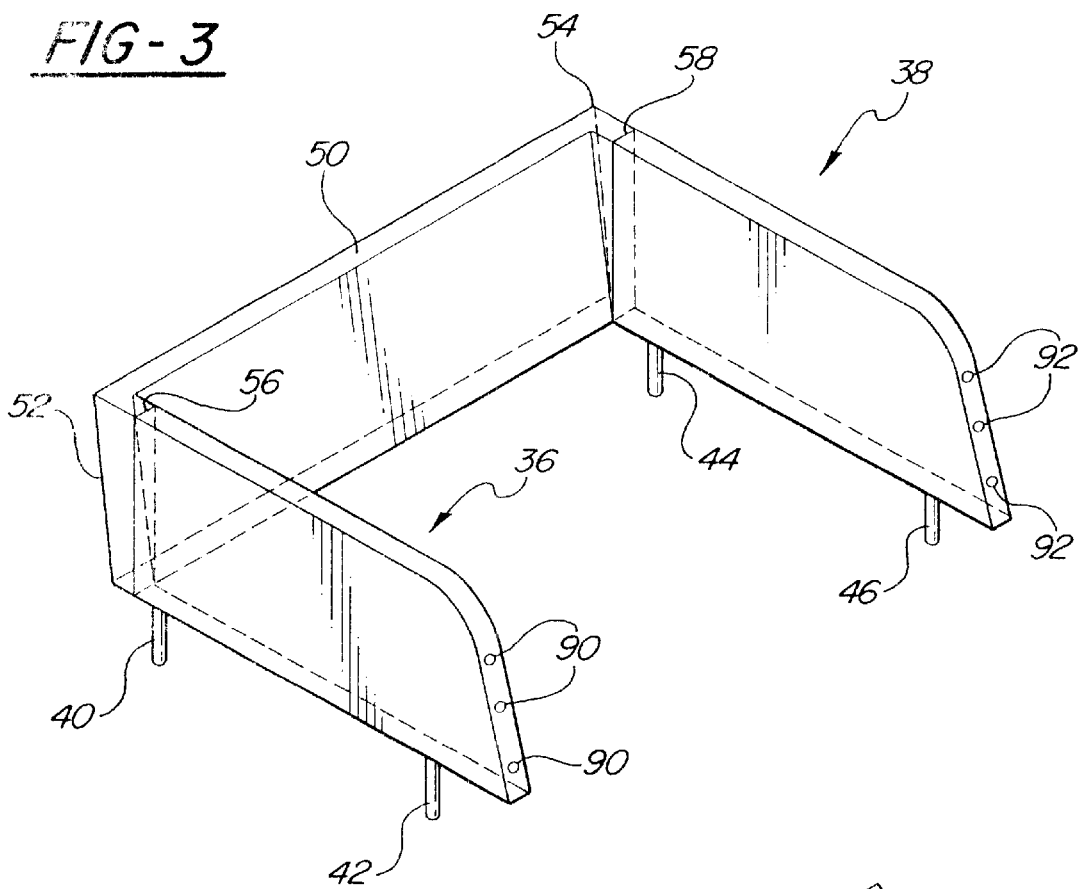
FIG. 3 is a sectional view in perspective of interconnecting main side panels and cross wise extending front panel according to the present invention.

Although not shown, it is also understood that various types of interengaging mechanisms can be employed, such including fasteners, tab and slot arrangements and the like (all not shown) and in order to engage the side panels 36 and 38 to the front panel 50 as shown in FIG. 3. It is further understood (referring ahead to FIG. 7) that front panel 50' can be integrally formed with associated main side panels 36' and 38' and, in some instances, the front panel, 50 or 50', can be deleted entirely in either of the preferred embodiments and without departing from the scope of the invention.

Figure 4:
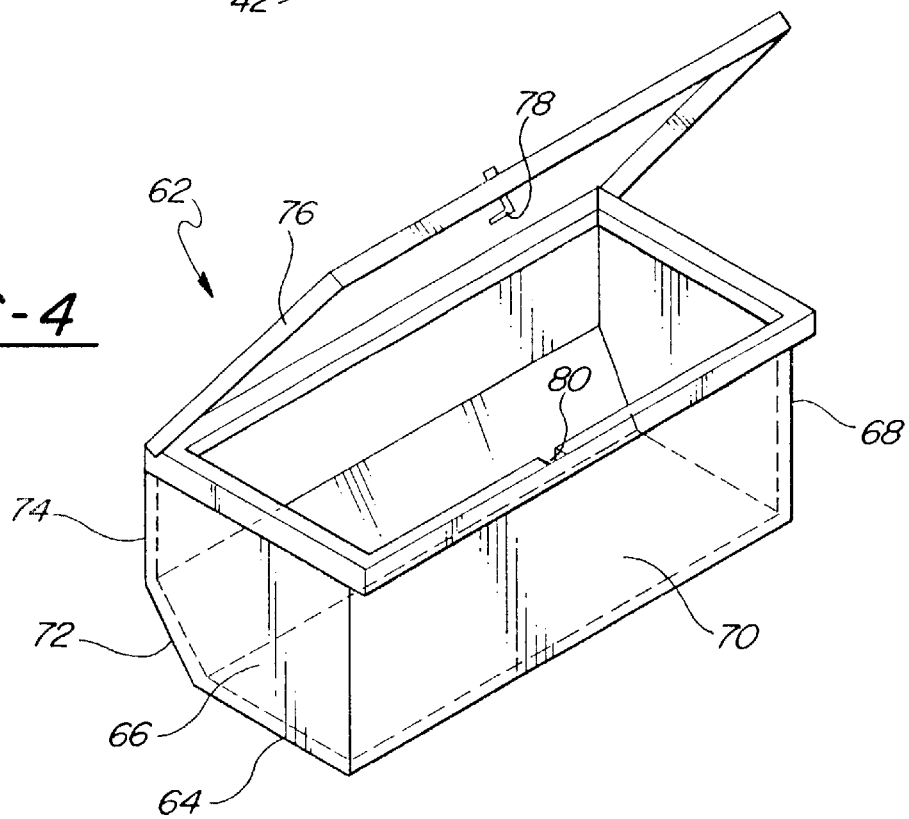
FIG. 4 is a sectional view of the storage container forming a part of the present invention.

Referring again to FIGS. 1 and 2, as well as to FIG. 4, a storage container 62 is provided and which is supported upon the truck bed bottom 16 in proximity to the rear tail gate 24. The container 62 has a given three dimensional, and preferably modified cuboidal, shape with a base constructed of a bottom 64, first 66 and second 68 side walls, rear wall 70 and front wall further defined by first 72 and second 74 surfaces in angular configuration and for mating with the wheel wells 26 and 28 configured in the truck bed. In this fashion, the storage container 62 is fixedly positioned behind the wheel wells 26 and 28 in proximity to the rear tailgate 24. A lid 76 is secured in pivoting fashion to the base, along top edge of surface 74, and a locking mechanism is further provided, see specifically rotating tab 78 projecting from an exposed end of the lid 76 and engageable within a recessed area 80 defined within a top edge surface of the rear wall 70 for securing the lid 76 in a closed position over the base.

Figure 6:
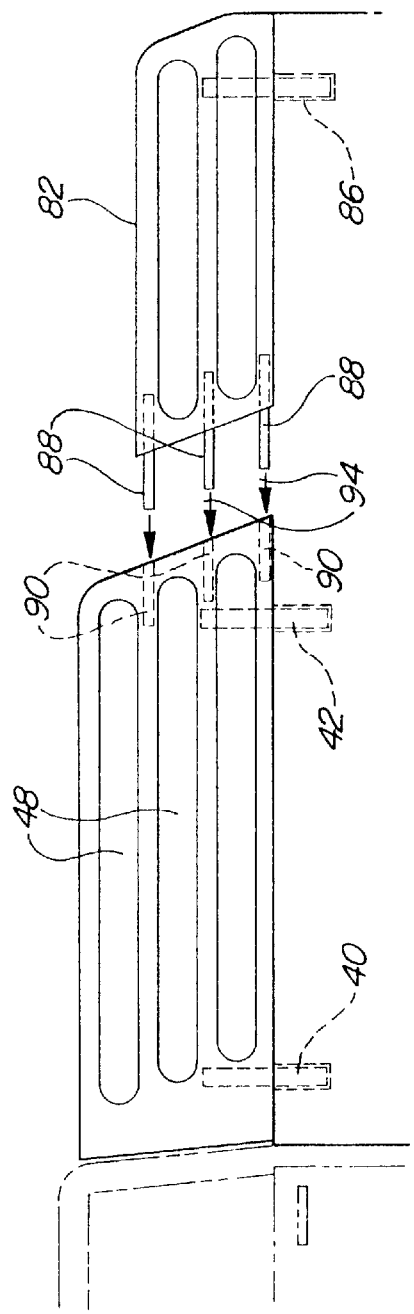
FIG. 6 is an exploded view illustrating the manner in which the rear panels horizontally engage with the main panels as well as illustrating the downwardly extending stabilizer pins for engaging, respectively the apertured portions formed in the truck bed and according to the present invention.
Figure 7:
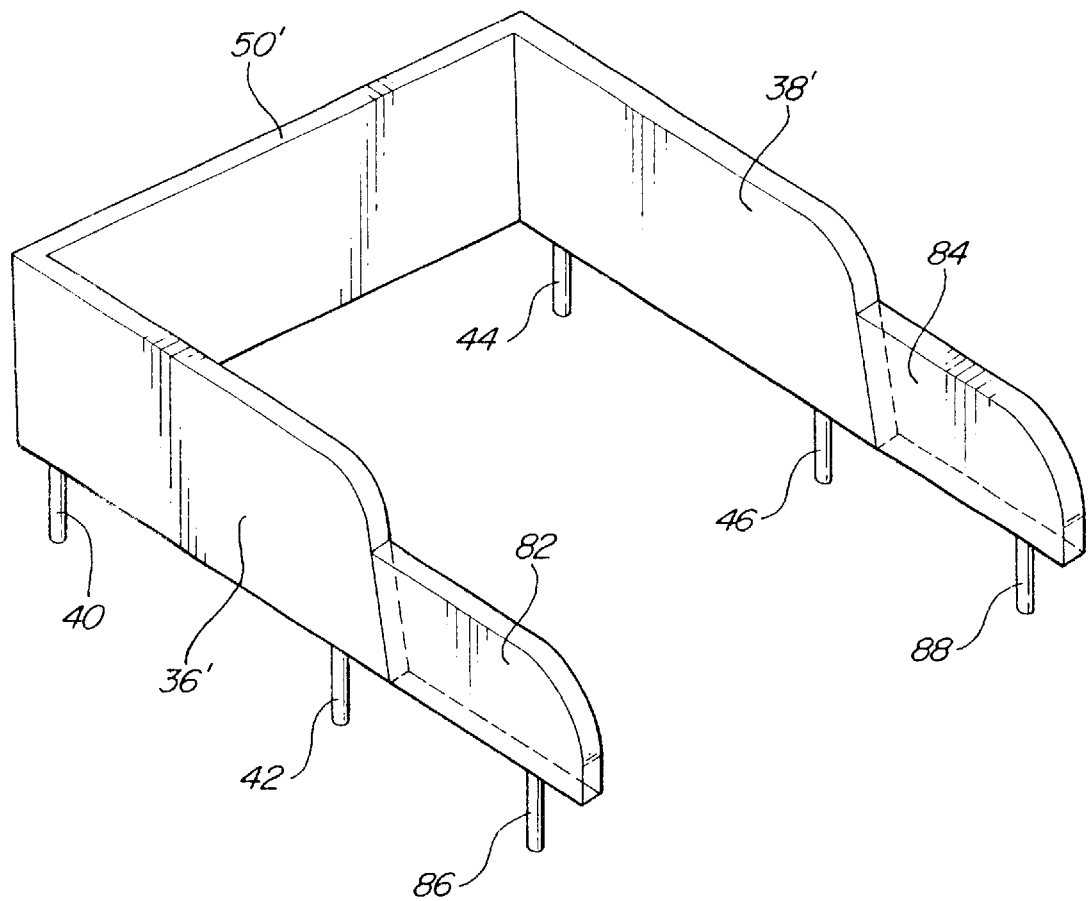
FIG. 7 is a sectional view in perspective, similar to that illustrated in FIG. 3, and showing from another vantage the interconnection of the rear panels to the front main panels.

In certain applications, and referring further to FIGS. 5–7, a pair of rear side panels 82 and 84 are employed, each having a similar and typically reduced size planar and elongated shape and each also including downwardly extending stabilizer pins (see at 86 for rear side panel 82 and at 88 for rear side panel 84) which are receivingly engaged within additional and associated downwardly recessed apertures of the truck bed. The ability to interengage the rear panels 82 and 84 with the main panels 36 and 38 is also provided by associating pluralities of horizontally projecting pins and horizontally recessed apertures defined therebetween.

In one arrangement, the pins are defined in horizontally projecting fashion (see at 88 from rear panel 82 associated with the left side of the vehicle), and the main side panels each further include the horizontally extending recesses (see at 90 for left side main panel 36, as well as at 92 for left side main panel 38) defined in associated rearwardly facing edges and which receivingly engage the pins of an associated rear panel in a substantially horizontal inserting direction 94 (see also FIG. 6). The right side pins are hidden from view in the illustration of FIGS. 5 and 6, however are understood to be identical in arrangement. It is also understood that the arrangement of the pins and recesses can be reversed from that shown in FIGS. 5 and 6 and it is further envisioned that other types of interengaging structure for engaging the main and rear side panels together can be employed without departing from the scope of the present invention.

It is evident that the present invention discloses a unique combination side panel and storage container assembly for use with a truck bed and which is a novel improvement over the prior art. Having further described my invention, additional preferred embodiments will become apparent to those skilled in the art to which it pertains and without deviating from the scope of the appended claims.

We claim:

1. A combination side panel and storage container assembly for use with a pickup truck, the truck including a bed defined by a bottom, a front wall, extending side walls and a rear tail gate, the truck bed further including wheel wells, said assembly further comprising:

a pair of main side panels each having a substantially planar and elongated shape and engageable in fixed and upwardly extending fashion from the extending side walls of the truck bed; and a storage container supported upon the truck bed bottom in proximity to the rear tail gate, said storage container including a hingedly secured lid, said storage container further comprising at least first and second surfaces configured for mating with the wheel wells for fixing said container in place in abutting fashion against the vehicle tail gate.

2. The invention as described in claim 1, the truck bed further having substantially downwardly extending and recessed apertures defined in the extending side walls, said side panels each further comprising downwardly extending stabilizer pins which are receivably engaged within the recessed apertures.

3. A combination side panel and storage container assembly for use with a pickup truck, the truck including a bed defined by a bottom, a front wall, extending side walls and a rear tail gate, said assembly further comprising:

a pair of main side panels each having a substantially planar and elongated shape and engageable in fixed and upwardly extending fashion from the extending side walls of the truck bed;

a front panel extending in interconnecting fashion between said pair of main side panels, said front panel further comprising forwardly extending and tapered edges extending oppositely from substantially planar, rear facing and interconnecting edges; and a storage container supported upon the truck bed bottom in proximity to the rear tail gate, said storage container including a hingedly secured lid.

4. The invention as described in claim 1, further comprising a pair of rear side panels, each of said rear panels having a substantially planar and elongated shape and being interengageable in horizontally inserting fashion with said main side panels prior to affixing in upwardly extending fashion from the extending side walls of the truck bed.

5. The invention as described in claim 4, said rear panels each further comprising a plurality of forwardly extending pins, said main side panels each further comprising a plurality of horizontally extending recesses defined in associated rearwardly facing edges which receivingly engage said pins of an associated rear panel.

6. The invention as described in claim 4, said rear panels each further comprising downwardly extending stabilizer pins receivably engaged within the recessed apertures of the truck side walls.

7. The invention as described in claim 1, further comprising a front panel extending in interconnecting fashion between said pair of main side panels.

8. The invention as described in claim 7, said front panel further comprising forwardly extending and tapered edges extending oppositely from substantially planar, rear facing and interconnecting edges.

9. The invention as described in claim 4, each of said pair of main side panels and rear side panels having a specified length, width and thickness and further being constructed of a durable and plasticized material.

10. The invention as described in claim 1, said storage container having a given three-dimensional shape and further comprising a locking mechanism for engaging said lid thereto.

11. The invention as described in claim 1, said storage container having a modified cuboidal shape with a base constructed of a bottom, first and second side walls, rear wall and front wall, said front wall corresponding to said first and second configured surfaces.

* * * * *